(12) United States Patent
Chang et al.

(10) Patent No.: US 10,986,051 B1
(45) Date of Patent: Apr. 20, 2021

(54) SYSTEM AND METHOD FOR DYNAMIC CHAT MESSAGE CUSTOMIZATION

(71) Applicant: salesforce.com, inc., San Francisco, CA (US)

(72) Inventors: William Chang, Sunnyvale, CA (US);
Benjamin Drasin, Portland, OR (US);
Justin MacMillin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/671,059

(22) Filed: Oct. 31, 2019

(51) Int. Cl.
*H04L 12/58* (2006.01)

(52) U.S. Cl.
CPC .................... *H04L 51/046* (2013.01)

(58) Field of Classification Search
CPC ..................................................... H04L 51/046
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |

(Continued)

*Primary Examiner* — Kristie D Shingles
(74) *Attorney, Agent, or Firm* — Lorenz & Kopf, LLP (57) ABSTRACT

A method for providing a customizable chat window for a webpage is disclosed. The method comprises: receiving a user-specific component customized by a first user that identifies user-selected customizations for a chat message user interface (UI) of the first user; providing a snippet of code from a host chat application to a computing device associated with the first user to add to the webpage of the first user wherein activation of the snippet of code at the webpage of the first user causes the host chat application to be bootstrapped and causes the chat message UI of the first user to be loaded with the user-selected customizations; providing second code for rendering the chat message UI of the first user along with the user-selected customizations for the chat message UI, over a network, to a computing device associated with a second user; and modifying an actual chat message that is communicated using the chat message UI by applying the user-selected customizations to the chat message.

20 Claims, 5 Drawing Sheets

(56) References Cited

U.S. PATENT DOCUMENTS

| | | |
|---|---|---|
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2008/0307413 A1* | 12/2008 | Ferris .................. G06F 3/048 717/178 |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0213642 A1* | 9/2011 | Makar .................. G06F 40/30 705/7.38 |
| 2011/0247051 A1 | 10/2011 | Bulumulla et al. |
| 2012/0042218 A1 | 2/2012 | Cinarkaya et al. |
| 2012/0218958 A1 | 8/2012 | Warshavsky et al. |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

SYSTEM AND METHOD FOR DYNAMIC CHAT MESSAGE CUSTOMIZATION

TECHNICAL FIELD

Embodiments of the subject matter described herein relate generally chat messaging systems and methods, and more particularly to user-customizable chat messaging systems and methods.

BACKGROUND

Chat messaging systems have been provided by service providers for use with a customer's website to allow the customer to connect with its customers via on-demand live chat sessions. Chat messaging systems can be used for providing sales support, technical support, or other types of customer support. Service providers for chat messaging systems are limited in the amount of customization they can provide for customizing the chat messaging user interface.

Accordingly, it is desirable to provide systems and methods for providing a customizable chat experience for a webpage provider. Furthermore, other desirable features and characteristics of the present disclosure will become apparent from the subsequent detailed description and the appended claims, taken in conjunction with the accompanying drawings and the background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a processor-implemented method of providing a customizable chat window for a webpage is provided. The method includes: receiving a user-specific component customized by a first user that identifies one or more user-selected customizations for a chat message user interface (UI) of the first user, wherein the one or more user-selected customizations for a chat message UI of the first user includes user-customized HTML code and/or JavaScript code that affects the appearance and/or content in a chat bubble for a chat message; providing a first snippet of code from a host chat application to a computing device associated with the first user to add to the webpage of the first user wherein activation of the first snippet of code at the webpage of the first user causes the host chat application to be bootstrapped and causes the chat message UI of the first user loaded with the one or more user-selected customizations for the chat message UI of the first user; providing second code for rendering the chat message UI of the first user along with the one or more user-selected customizations for the chat message UI of the first user, over a network, to a computing device associated with a second user responsive to activation of the first snippet of code; receiving a chat message from a computing device associated with the first user via the chat message UI of the first user; applying the one or more user-selected customizations to the received chat message to create a customized chat message; and causing the customized chat message to be provided to the computing device associated with the second user to be rendered by the computing device associated with the second user via the chat message UI of the first user.

In another embodiment, a system for providing a customizable chat window for a webpage is provided. The system includes one or more processors configured by programming instructions on non-transitory computer readable media. The system is configured to: receive a user-specific component customized by a first user that identifies one or more user-selected customizations for a chat message user interface (UI) of the first user, wherein the one or more user-selected customizations for a chat message UI of the first user includes user-customized HTML code and/or JavaScript code that affects the appearance and/or content in a chat bubble for a chat message; provide a first snippet of code from a host chat application to a computing device associated with the first user to add to the webpage of the first user wherein activation of the first snippet of code at the webpage of the first user causes the host chat application to be bootstrapped and causes the chat message UI of the first user to be loaded with the one or more user-selected customizations for the chat message UI of the first user; provide second code for rendering the chat message UI of the first user along with the one or more user-selected customizations for the chat message UI of the first user, over a network, to a computing device associated with a second user responsive to activation of the first snippet of code; receive a chat message from a computing device associated with the first user via the chat message UI of the first user; apply the one or more user-selected customizations to the received chat message to create a customized chat message; and cause the customized chat message to be provided to the computing device associated with the second user to be rendered by the computing device associated with the second user via the chat message UI of the first user.

Furthermore, other desirable features and characteristics will become apparent from the subsequent detailed description and the appended claims, taken in conjunction with the accompanying drawings and the preceding background.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
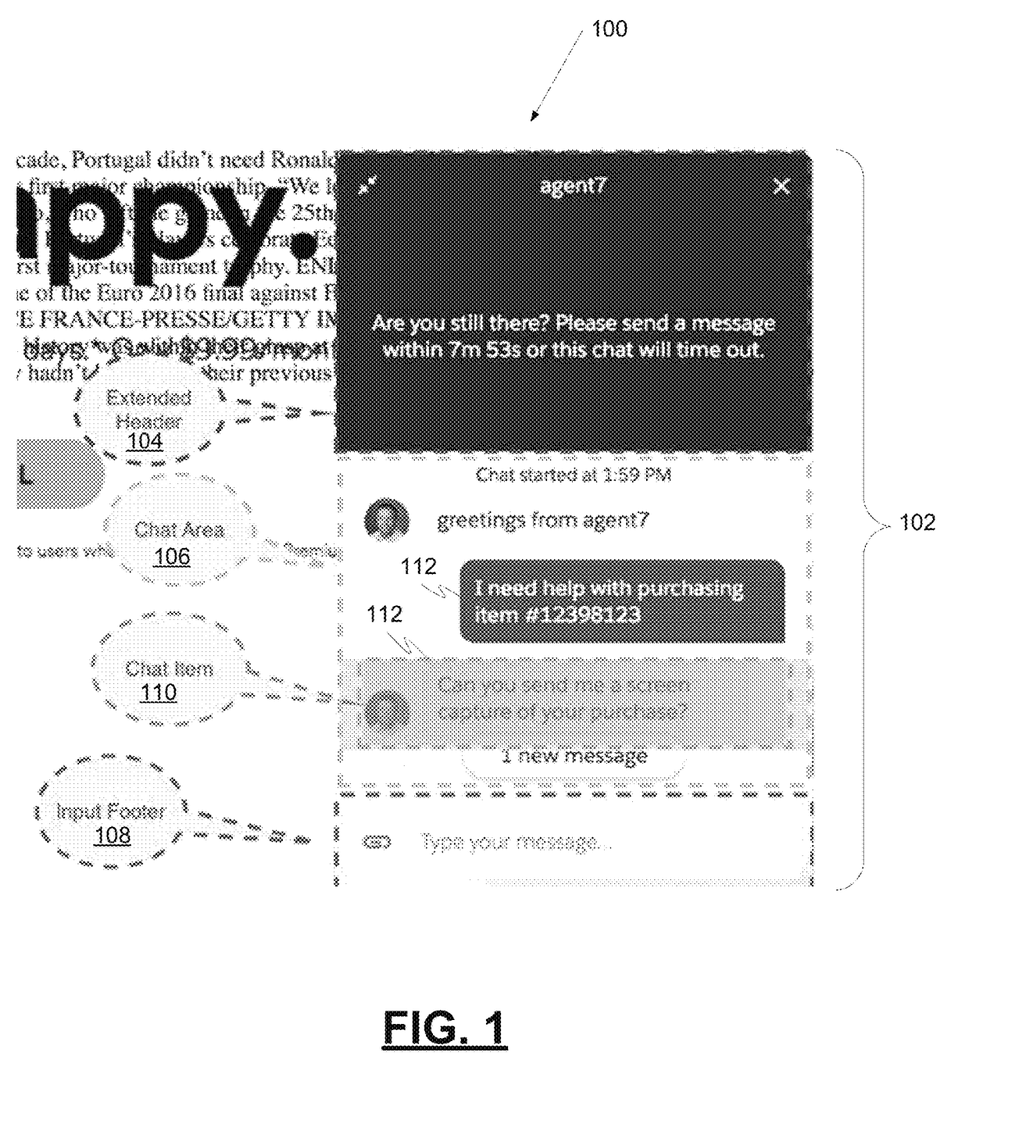
FIG. 1 is a block diagram depicting an example chat user interface (UI) that may be provided on a webpage for allowing a webpage visitor to chat with an associate of the webpage provider, such as a technical support agent, in accordance with some embodiments.

FIG. 1 is a block diagram depicting an example chat user interface (UI) 102 that may be provided on a webpage 100 for allowing a webpage visitor to chat with an associate of the webpage provider, such as a technical support agent. The chat UI 102 includes a chat header 104, a chat area 106, and an input footer 108. The chat area 106 is arranged to display chat items 110 (e.g., messages 112 and media such as pictures, gifs, videos, or the like) exchanged between chat participants (e.g., a webpage visitor and an associate of the webpage provider). The input footer 108 is configured to allow the webpage page visitor to enter a message directed to the associate of the webpage provider.

The subject matter described herein discloses apparatus, systems, techniques and articles for providing a customizable chat experience for a webpage provider. The apparatus, systems, techniques and articles described herein describe a customizable chat message system that may allow a webpage provider to provide access to a user-customized chat window for its webpage. The customizable chat message system may allow a user (e.g., the webpage provider) to apply one or more user-selected customizations to the chat message UI of the user. The one or more user-selected customizations includes user-customized code, such as user-customized HTML code, user-customized JavaScript code, and/or user-customized CSS, that affects the appearance and/or content in a chat bubble for a chat message provided by the webpage of the user.

Non-limiting examples of the one or more user-selected customizations resulting from the inclusion of user-customized code may include: shortening a URL within the text content; rendering media inline in a message bubble wherein the media may include a video and/or image; supporting and displaying an emoji; adding a link image preview for links in a message; and rendering another component within the message bubble to: for example, show a carousel of shopping options, a checkout/pay selection widget for a shopping cart, a flow to fill out a form, or collect a digital signature.

Figure 2:
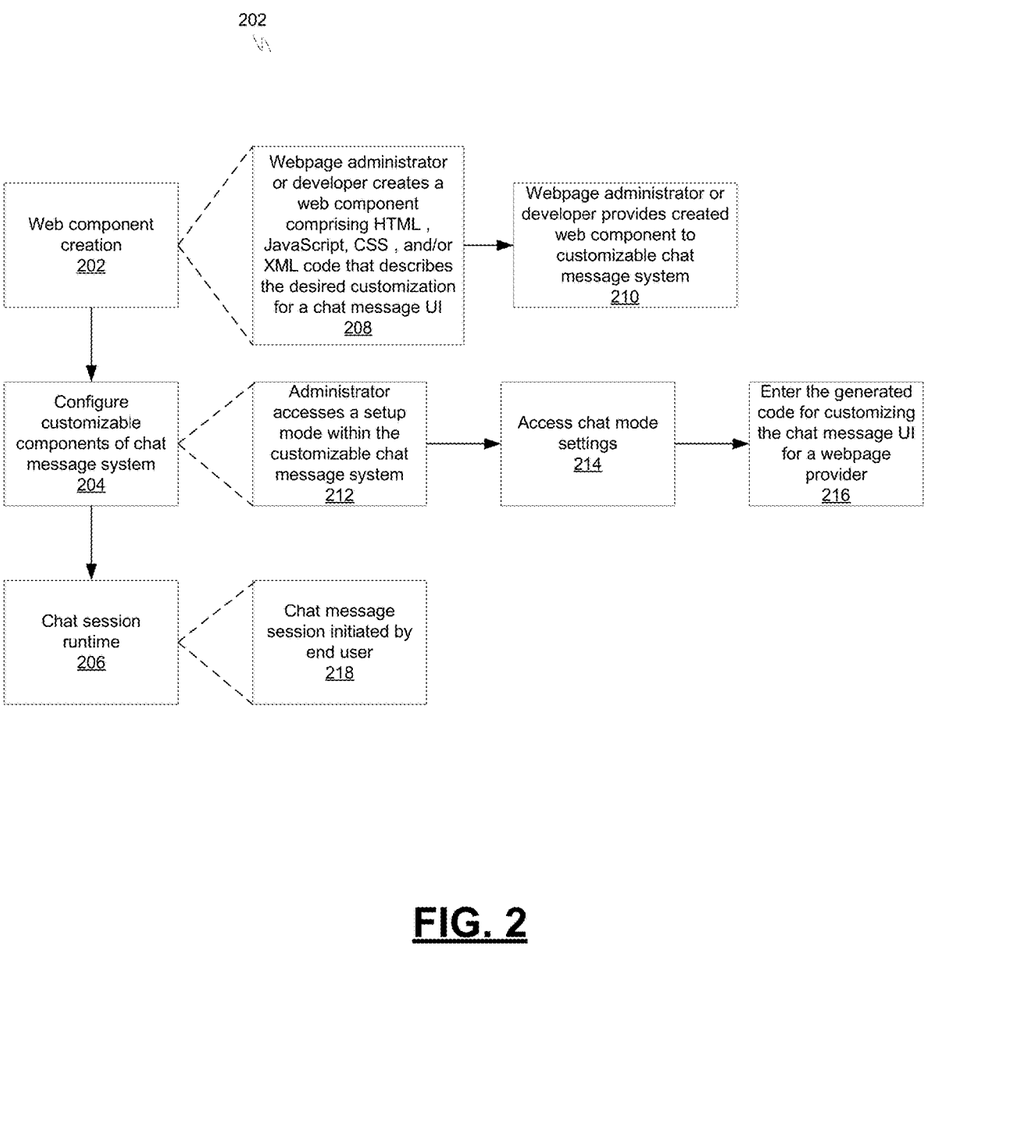
FIG. 2 is a process flow diagram depicting an example process for customizing a chat message UI and setting up a chat session using the customized chat message UI, in accordance with some embodiments.

FIG. 2 is a process flow diagram depicting an example process 200 for customizing a chat message UI and setting up a chat session using the customized chat message UI. The example process 200 includes three steps. In a first step (operation 202), a web component is created. In a second step (operation 204), customizable components of a chat message system are configured using the created web component. In a third step, during chat session runtime, (operation 206), a chat application within the chat message system facilitates a chat message session by providing a chat message UI with chat messages that have been customized using the web component.

In the example process 200, an example implementation of the first step (operation 202), wherein a web component is created, involves an administrator of a webpage provider or developer creating a web component comprising HTML code, JavaScript, CSS code, and/or XML code that describes the desired customization for a chat message UI (operation 208). The created web component is then provided by the administrator or developer to a customizable chat message system (operation 210).

In the example process 200, an example implementation of the second step (operation 204), wherein customizable components of the customizable chat message system are configured using the created web component, involves an administrator accessing a setup mode within the customizable chat message system for an account associated with the webpage provider (operation 212), specifically accessing chat settings (operation 214), and entering the generated code for customizing the chat message UI for the webpage provider (operation 216). This step also involves the customizable chat message system providing the webpage provider with code (e.g., JavaScript) that can be used to bootstrap a chat message application within the customizable chat message system that can facilitate a chat message session that will apply the customizable components.

In the example process 200, an example implementation of the third step (operation 206), during runtime, an end user chat message participants starts a chat session with an associate of the webpage provider (e.g., customer support agent) using, for example, an embedded service widget accessible via a webpage of the webpage provider (operation 218). The embedded service widget, for example, may have been loaded from the JavaScript code provided by the customizable chat message system and inserted on a customer support webpage for the webpage provider.

Figure 3:
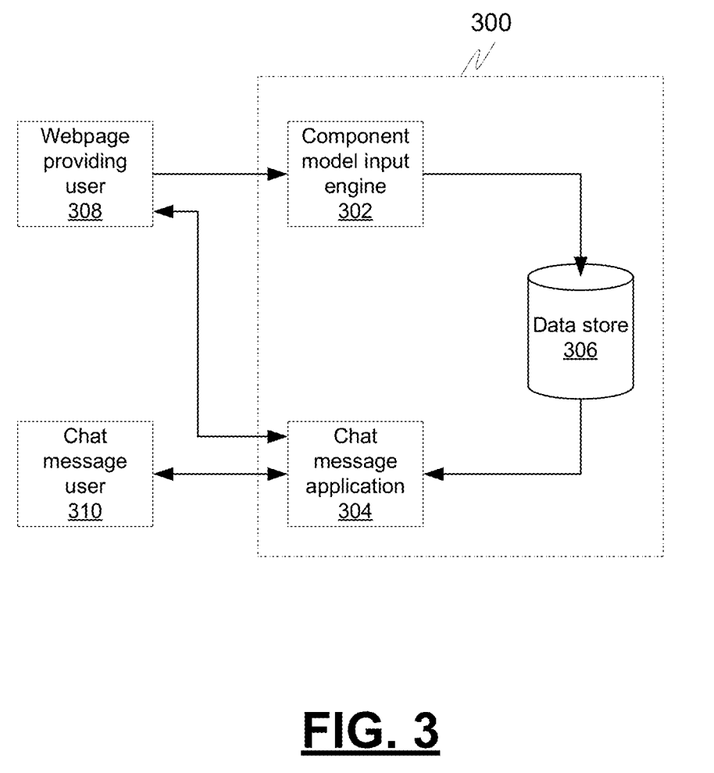
FIG. 3 is a block diagram depicting an example chat message system for providing a customizable chat window for a webpage, in accordance with some embodiments.

FIG. 3 is a block diagram depicting an example chat message system 300 for providing a customizable chat window for a webpage. The system 300 comprises one or more processors configured by programming instructions on non-transitory computer readable media. The one or more processors in the system are configured by the programming instructions to implement a component model input engine 302 and a chat message application 304. The system 300 further includes a data store 306 for storing one or more user components containing user-selectable chat message customizations.

The component model input engine 302 is configured to receive a user-specific component customized by a user 308 of the chat message system that identifies one or more user-selected customizations for a chat message user interface (UI) of the user 308 that will be included on a webpage of the user 308. The one or more user-selected customizations for the chat message UI of the user 308 includes user-customized code that includes user-customized HTML code, user-customized JavaScript code, and/or user-customized CSS code that affects the appearance and/or content in a chat bubble for a chat message provided by the webpage of the user 308.

The one or more user-selected customizations may comprise one or more of: shortening a URL within the text content; rendering media inline in the message bubble, the media including a video and/or image; supporting and displaying an emoji; adding a link image preview for links in a message; and rendering another component within the message bubble to: show a carousel of shopping options, a checkout/pay selection widget for a shopping cart, a flow to fill out a form, or collect a digital signature.

The example component model input engine 302 is further configured to provide a component model for use by the user 308 for writing a user-specific component that provides the user with a capability to alter HTML code, JavaScript code, and CSS code in the DOM (document object model) used to render a chat message UI on a webpage of the user 308 and that identifies one or more user-selected customizations for the chat message UI for deployment on the webpage of the user 308. To provide a component model, the example component model input engine 302 may be further configured to provide a component model from an integrated system (e.g., component creation facility) that provides user-selectable options for selecting customizations. To receive a user-specific component customized by a first user, the example component model input engine 302 may be configured to: provide a user interface for receiving user-selection of the one or more user-selected customizations for a chat message UI of the user 308; receive user-selection of the one or more user-selected customizations for a chat message UI of the user 308; generate code, based on the received one or more user-selected customizations, for rendering the one or more user-selected customizations for the chat message UI of the user 308; and store the generated code as the user-specific component customized by the user 308, for example, in the data store 306.

The chat message application 304 is configured to provide a snippet of code from the chat application to the user 308 to add to the webpage of the user 308 wherein activation of the snippet of code at the webpage of the first user causes the chat application to be bootstrapped and causes the chat message UI of the user 308 to be loaded with the one or more user-selected customizations for the chat message UI of the user 308. The snippet of code may comprise a JavaScript snippet of code. The snippet of code may contain information about the deployment settings for the chat message UI of the user 308 and not information specifying the customizations for the chat message UI of the user 308.

The chat message application 304 is also configured to provide code, over a network (e.g., the Internet), for rendering the chat message UI of the user 308 along with the one or more user-selected customizations for the chat message UI of the user 308 to a computing device associated with a chat message user 310 responsive to activation of the snippet of code.

The example chat message application 304 is further configured to modify an actual chat message that is communicated using the chat message UI by applying the one or more user-selected customizations to the chat message and providing the modified chat message to the chat message UI of the user 308 rendered by the computing device associated with the chat message user 310. To modify an actual chat message, the example chat message application 304 may be configured to: receive the actual chat message over the network; parse the actual chat message; and replace text in the actual chat message with something else. The something else may be an inline image, video, or other rich media.

Figure 4:
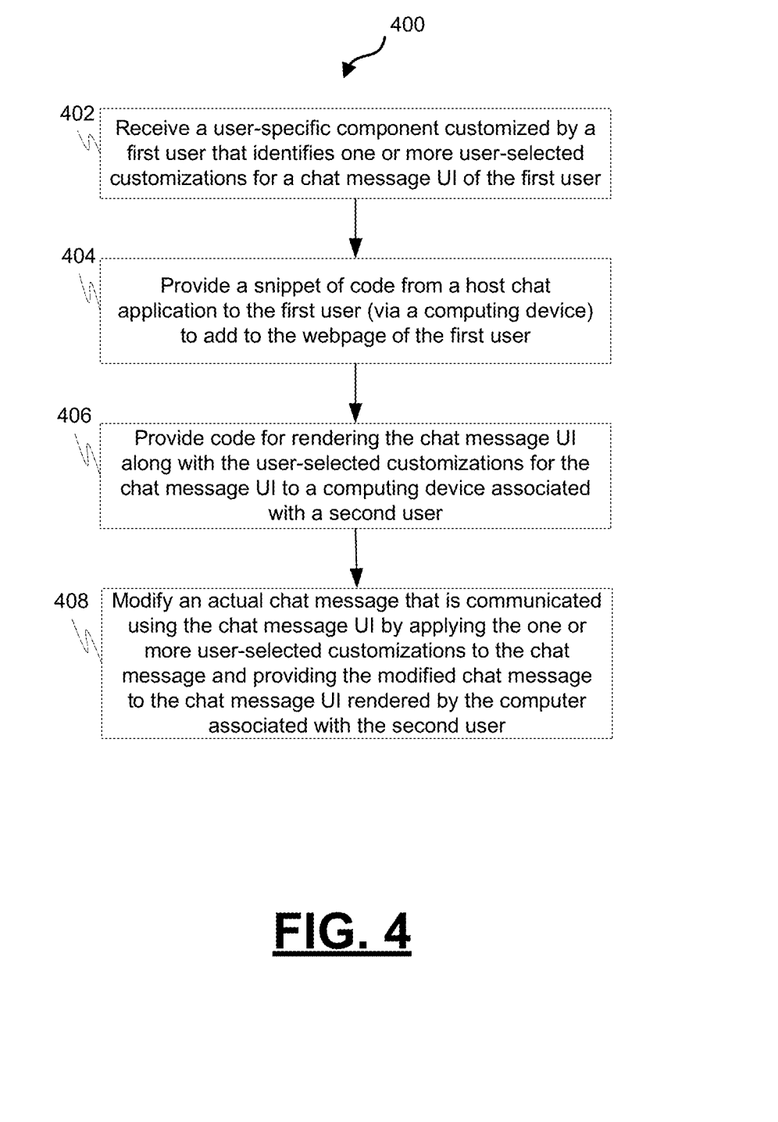
FIG. 4 is a process flow chart depicting an example process of providing a customizable chat window for a webpage, in accordance with some embodiments.

FIG. 4 is a process flow chart depicting an example process 400 for providing a customizable chat window for a webpage. The order of operation within the example process 400 is not limited to the sequential execution as illustrated in the figure, but may be performed in one or more varying orders as applicable and in accordance with the present disclosure.

The example process includes receiving a user-specific component customized by a first user that identifies one or more user-selected customizations for a chat message user interface (UI) of the first user (operation 402). The one or more user-selected customizations for a chat message UI of the first user may include user-customized code such as user-customized HTML code, CSS code, and/or JavaScript code that affects the appearance and/or content in a chat bubble for a chat message. The receiving a user-specific component customized by a first user may include: providing a user interface for receiving user-selection of the one or more user-selected customizations for a chat message UI of the first user; receiving user-selection of the one or more user-selected customizations for a chat message UI of the first user; generating code, based on the received one or more user-selected customizations, for rendering the one or more user-selected customizations for the chat message UI of the first user; and storing the generated code as the user-specific component customized by a first user.

The receiving a user-specific component customized by a first user may involve providing a component model for use by a user for writing a user-specific component that provides the user with a capability to alter HTML (hypertext markup language) code, JavaScript code, and CSS (cascading style sheets) code in the DOM (document object model) used to render a chat message UI on a webpage of the user and that identifies one or more user-selected customizations for the chat message UI for deployment on the webpage of the user. The providing a component model may include providing a component model from an integrated system (component creation facility) that provides user-selectable options for selecting customizations. The one or more user-selected customizations for a chat message UI of the first user may include a customer provided resource wherein the customer provided resource includes an image, CSS code, and/or video. The one or more user-selected customizations may result in one or more of: shortening a URL within the text content; rendering media inline in the message bubble wherein the media includes a video and/or image; supporting and displaying an emoji; adding a link image preview for links in a message; and/or rendering another component within the message bubble, for example, to show a carousel of shopping options, a checkout/pay selection widget for a shopping cart, a flow to fill out a form, or collect a digital signature.

The example process 400 includes providing a snippet of code from a host chat application to the first user (via a computing device associated with the first user) to add to the webpage of the first user (operation 404). Activation of the snippet of code at the webpage of the first user causes the chat application to be bootstrapped and causes the chat message UI of the first user to be loaded with the one or more user-selected customizations for the chat message UI of the first user. The provided snippet of code may comprise a JavaScript snippet of code. Activating the snippet of code may comprise activating the snippet of code responsive to selection of a chat message widget on the webpage of the first user by a second user. The snippet of code may contain information about the deployment settings for the chat message UI of the first user and not information specifying the customizations for the chat message UI of the user.

The example process 400 includes providing code, over a network, for rendering the chat message UI of the first user along with the one or more user-selected customizations for the chat message UI of the first user to a computing device associated with a second user responsive to activation of the snippet of code (operation 406).

The example process 400 includes modifying an actual chat message that is communicated using the chat message UI by applying the one or more user-selected customizations to the chat message and providing the modified chat message to the chat message UI of the first user rendered by the computing device associated with the second user (operation 408). The modifying an actual chat message may comprise: receiving the actual chat message over the network; parsing the actual chat message; and replacing text in the actual chat message with something else, the something else comprising an inline image, video, or other rich media.

Figure 5:
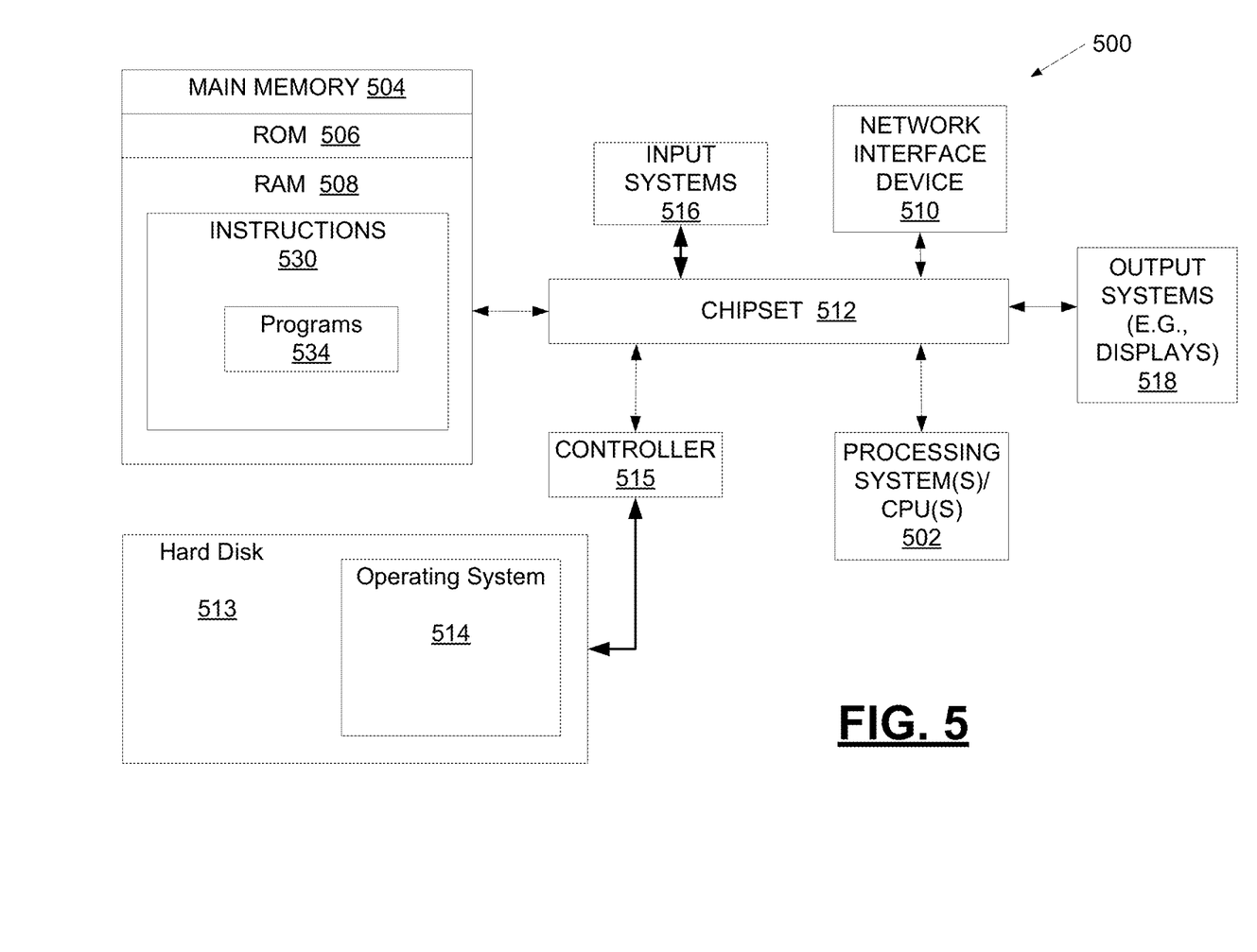
FIG. 5 is a schematic block diagram of an example computer system that can be used to implement the techniques and methods described herein, in accordance with some embodiments.

FIG. 5 is a schematic block diagram of an example computer system that can be used to implement the techniques and methods described herein. The example computer system can include one or more processing system(s) 502, main memory 504, a network interface device (NID)

510, a chipset 512, a hard disk 513 and hard disk controller 515, input systems 516, and output systems 518.

The chipset 512 is usually located on a motherboard and is a set of electronic components (e.g., in an integrated circuit) that interconnects and manages the data flow between the processing system(s) 502 and other elements of the computer system and connected peripherals. For instance, the chipset 512 provides an interface between the processing system(s) 502 and the main memory 504, and also includes functionality for providing network connectivity through the NID 510, such as a gigabit Ethernet adapter. The chipset 512 typically contains the processor bus interface (also known as a front-side bus), memory controllers, bus controllers, I/O controllers, etc.

Processing system(s) 502 represents one or more general-purpose processing devices such as a microprocessor, central processing unit, or the like. More particularly, the processing system(s) 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 502 may also be one or more special-purpose processing devices such as an application specific integrated circuit (ASIC), a field programmable gate array (FPGA), a digital signal processor (DSP), network processor, or the like.

The processing system(s) 502 can include one or more central processing units (CPUs) that operate in conjunction with the chipset 512. The processing system(s) 502 perform arithmetic and logical operations necessary for the operation of the example computer system.

The NID 510 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 516 (or input device(s)) allow a user to input information to the computer system and can include things such as a keyboard, a mouse or other cursor pointing device, a pen, a voice input device, a touch input device, a webcam device, a microphone, etc. Output system(s) 518 (or output device(s)) present information to the user of the computer system and can include things such as a display, monitor, speakers, or the like.

The chipset 512 can provide an interface to various forms of computer-readable storage media including a main memory 504 (e.g., read-only memory (ROM), flash memory, dynamic random access memory (DRAM) such as synchronous DRAM (SDRAM)), and hard disk 513. The processing system(s) 502 can communicate with the various forms of computer-readable storage media via the chipset 512 and appropriate buses.

A hard disk 513 is a form of non-volatile memory that can store an operating system (OS) 514. The operating system 514 is software that is copied into RAM and executed by the processing system(s) 502 to control the operation of the example computer system, manage computer hardware and software resources, and provide common services for computer programs executed by the processing system(s) 502. Regardless of the implementation, the operating system 514 includes many different "components" that make the different parts of the example computer system work together. The disk controller 515 is the controller circuit which enables the processing system 502 to communicate with a hard disk 513, and provides an interface between the hard disk 513 and the bus connecting it to the rest of the system.

The main memory 504 may be composed of many different types of memory components. The main memory 504 can include non-volatile memory (such as read-only memory (ROM) 506, flash memory, etc.), volatile memory (such as random access memory (RAM) 508), or some combination of the two. The RAM 508 can be any type of suitable random access memory including the various types of dynamic random access memory (DRAM) such as SDRAM, the various types of static RAM (SRAM). The main memory 504 (as well as the processing system(s) 502) may be distributed throughout the example computer system.

The ROM 506 of the main memory 504 can be used to store firmware that includes program code containing the basic routines that help to start up the example computer system and to transfer information between elements within the example computer system. The ROM of the main memory 504 may also store other software components necessary for the operation of the example computer system.

The RAM 508 stores programs/instructions 530 or executable code for one or more programs 534 that can be loaded and executed at processing system(s) 502 to perform various functions. The programs/instructions 530 are computer readable program code that can be stored in RAM 508 (or other a non-transitory computer readable medium of the example computer system) that can be read and executed by processing system(s) 502 to perform various acts, tasks, functions, and steps as described herein. The methods and techniques described herein can be captured in programming instructions 530 for execution by the processing system 502 to cause the example computer system to perform the described methods, processes, and techniques.

The subject matter described herein discloses apparatus, systems, techniques and articles for providing a customizable chat experience for a webpage provider. In one embodiment, a processor-implemented method of providing a customizable chat window for a webpage is provided. The method comprises: receiving a user-specific component customized by a first user that identifies one or more user-selected customizations for a chat message user interface (UI) of the first user, wherein the one or more user-selected customizations for a chat message UI of the first user includes user-customized HTML code and/or JavaScript code that affects the appearance and/or content in a chat bubble for a chat message; providing a first snippet of code from a host chat application to a computing device associated with the first user to add to the webpage of the first user wherein activation of the first snippet of code at the webpage of the first user causes the host chat application to be bootstrapped and causes the chat message UI of the first user to be loaded with the one or more user-selected customizations for the chat message UI of the first user; providing second code for rendering the chat message UI of the first user along with the one or more user-selected customizations for the chat message UI of the first user, over a network, to a computing device associated with a second user responsive to activation of the first snippet of code; receiving a chat message from a computing device associated with the first user via the chat message UI of the first user; applying the one or more user-selected customizations to the received chat message to create a customized chat message; and causing the customized chat message to be provided to the computing device associated with the second user to be rendered by the computing device associated with the second user via the chat message UI of the first user.

These aspects and other embodiments may include one or more of the following features. The method may further comprise providing a component model for use by a user for writing a user-specific component that provides the user with a capability to alter HTML (hypertext markup language) code, JavaScript code, and CSS (cascading style sheets) code in the DOM (document object model) used to render a chat message UI on a webpage of the user and that identifies one or more user-selected customizations for the chat message UI for deployment on the webpage of the user. The providing a component model may comprise providing a component model from an integrated system (e.g., component creation facility) that provides user-selectable options for selecting customizations. The receiving a user-specific component customized by a first user may comprise: providing a user interface for receiving user-selection of the one or more user-selected customizations for a chat message UI of the first user; receiving user-selection of the one or more user-selected customizations for a chat message UI of the first user; generating code, based on the received one or more user-selected customizations, for rendering the one or more user-selected customizations for the chat message UI of the first user; and storing the generated code as the user-specific component customized by a first user. The providing a first snippet of code may comprise providing a JavaScript snippet of code. The activation of the first snippet of code may comprise activation of the first snippet of code responsive to selection of a chat message widget on the webpage of the first user by a second user. The first snippet of code may contain information about the deployment settings for the chat message UI of the first user and not information specifying the customizations for the chat message UI of the user. The one or more user-selected customizations for a chat message UI of the first user may include a customer provided resource wherein the customer provided resource includes an image, CSS code, and/or video. The one or more user-selected customizations may result in one or more of: shortening a URL within the text content; rendering media inline in the message bubble, the media including a video and/or image; supporting and displaying an emoji; adding a link image preview for links in a message; and rendering another component within the message bubble to: show a carousel of shopping options, a checkout/pay selection widget for a shopping cart, a flow to fill out a form, or collect a digital signature. The applying the one or more user-selected customizations to the received chat message to create a customized chat message may comprise: replacing text in the actual chat message with something else, the something else comprising an inline image, video, or other rich media.

In another embodiment, a system for providing a customizable chat window for a webpage is provided. The system comprises one or more processors configured by programming instructions on non-transitory computer readable media. The system is configured to: receive a user-specific component customized by a first user that identifies one or more user-selected customizations for a chat message user interface (UI) of the first user, wherein the one or more user-selected customizations for a chat message UI of the first user includes user-customized HTML code and/or JavaScript code that affects the appearance and/or content in a chat bubble for a chat message; provide a first snippet of code from a host chat application to a computing device associated with the first user to add to the webpage of the first user wherein activation of the first snippet of code at the webpage of the first user causes the host chat application to be bootstrapped and causes the chat message UI of the first user to be loaded with the one or more user-selected customizations for the chat message UI of the first user; provide second code for rendering the chat message UI of the first user along with the one or more user-selected customizations for the chat message UI of the first user, over a network, to a computing device associated with a second user responsive to activation of the first snippet of code; receive a chat message from a computing device associated with the first user via the chat message UI of the first user; apply the one or more user-selected customizations to the received chat message to create a customized chat message; and cause the customized chat message to be provided to the computing device associated with the second user to be rendered by the computing device associated with the second user via the chat message UI of the first user.

These aspects and other embodiments may include one or more of the following features. The system may be further configured to provide a component model for use by a user for writing a user-specific component that provides the user with a capability to alter HTML code, JavaScript code, and CSS code in the DOM (document object model) used to render a chat message UI on a webpage of the user and that identifies one or more user-selected customizations for the chat message UI for deployment on the webpage of the user. To provide a component model, the system may be configured to provide a component model from an integrated system (component creation facility) that provides user-selectable options for selecting customizations. To receive a user-specific component customized by a first user, the system may be configured to: provide a user interface for receiving user-selection of the one or more user-selected customizations for a chat message UI of the first user; receive user-selection of the one or more user-selected customizations for a chat message UI of the first user; generate code, based on the received one or more user-selected customizations, for rendering the one or more user-selected customizations for the chat message UI of the first user; and store the generated code as the user-specific component customized by a first user. The first snippet of code may comprise a JavaScript snippet of code. The first snippet of code may contain information about the deployment settings for the chat message UI of the first user and not information specifying the customizations for the chat message UI of the user. The one or more user-selected customizations may comprise one or more of: shortening a URL within the text content; rendering media inline in the message bubble, the media including a video and/or image; supporting and displaying an emoji; adding a link image preview for links in a message; and rendering another component within the message bubble to: show a carousel of shopping options, a checkout/pay selection widget for a shopping cart, a flow to fill out a form, or collect a digital signature. To apply the one or more user-selected customizations to the received chat message to create a customized chat message, the system may be configured to: replace text in the actual chat message with something else. To replace text in the actual chat message with something else, the system may be configured to add an inline image, video, or other rich media.

In another embodiment, non-transitory computer readable media encoded with programming instructions configurable to cause a processor to perform a method is provided. The method comprises: receiving a user-specific component customized by a first user that identifies one or more user-selected customizations for a chat message user interface (UI) of the first user, wherein the one or more user-selected customizations for a chat message UI of the first user includes user-customized HTML code and/or JavaScript code that affects the appearance and/or content in a chat bubble for a chat message; providing a first snippet of code from a host chat application to a computing device associated with the first user to add to the webpage of the first user wherein activation of the first snippet of code at the webpage of the first user causes the host chat application to be bootstrapped and causes the chat message UI of the first user to be loaded with the one or more user-selected customizations for the chat message UI of the first user; providing second code for rendering the chat message UI of the first user along with the one or more user-selected customizations for the chat message UI of the first user, over a network, to a computing device associated with a second user responsive to activation of the first snippet of code; receiving a chat message from a computing device associated with the first user via the chat message UI of the first user; applying the one or more user-selected customizations to the received chat message to create a customized chat message; and causing the customized chat message to be provided to the computing device associated with the second user to be rendered by the computing device associated with the second user via the chat message UI of the first user.

These aspects and other embodiments may include one or more of the following features. The method may further comprise providing a component model for use by a user for writing a user-specific component that provides the user with a capability to alter HTML (hypertext markup language) code, JavaScript code, and CSS (cascading style sheets) code in the DOM (document object model) used to render a chat message UI on a webpage of the user and that identifies one or more user-selected customizations for the chat message UI for deployment on the webpage of the user. The providing a component model may comprise providing a component model from an integrated system (component creation facility) that provides user-selectable options for selecting customizations. The receiving a user-specific component customized by a first user may comprise: providing a user interface for receiving user-selection of the one or more user-selected customizations for a chat message UI of the first user; receiving user-selection of the one or more user-selected customizations for a chat message UI of the first user; generating code, based on the received one or more user-selected customizations, for rendering the one or more user-selected customizations for the chat message UI of the first user; and storing the generated code as the user-specific component customized by a first user. The providing a first snippet of code may comprise providing a JavaScript snippet of code. The activation of the first snippet of code may comprise activation of the first snippet of code responsive to selection of a chat message widget on the webpage of the first user by a second user. The first snippet of code may contain information about the deployment settings for the chat message UI of the first user and not information specifying the customizations for the chat message UI of the user. The one or more user-selected customizations for a chat message UI of the first user may include a customer provided resource wherein the customer provided resource includes an image, CSS code, and/or video. The one or more user-selected customizations may comprise one or more of: shortening a URL within the text content; rendering media inline in the message bubble, the media including a video and/or image; supporting and displaying an emoji; adding a link image preview for links in a message; and rendering another component within the message bubble to: show a carousel of shopping options, a checkout/pay selection widget for a shopping cart, a flow to fill out a form, or collect a digital signature. The applying the one or more user-selected customizations to the received chat message to create a customized chat message may comprise: receiving the actual chat message over the network; parsing the actual chat message; and replacing text in the actual chat message with something else, the something else comprising an inline image, video, or other rich media.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A processor-implemented method implemented by a chat message service provider for providing a customizable chat window to a second user for a webpage provided by a first user, the method comprising:

receiving, at the chat message service provider over a network from a computing device associated with the first user, a user-specific component customized by the first user that identifies one or more user-selected customizations for a chat message user interface (UI) of the first user, the one or more user-selected customizations for a chat message UI of the first user including user-customized HTML code and/or JavaScript code that affects the appearance and/or content in a chat bubble for a chat message;

providing, by the chat message service provider, a first snippet of code from a host chat application implemented by the chat message service provider to a computing device associated with the first user to add to the webpage of the first user wherein activation of the first snippet of code at the webpage of the first user responsive to an action by a computing device associated with the second user causes the host chat application implemented by the chat message service provider to be bootstrapped and causes the chat message UI of the first user to be loaded by the host chat application with the one or more user-selected customizations for the chat message UI of the first user;

providing, by the host chat application of the chat message service provider, second code for rendering the chat message UI of the first user along with the one or more user-selected customizations for the chat message UI of the first user, over a network, to the computing device associated with the second user responsive to activation of the first snippet of code;

receiving, by the host chat application of the chat message service provider, a chat message from a computing device associated with the first user via the chat message UI of the first user;

applying, by the host chat application of the chat message service provider, the one or more user-selected customizations to the received chat message to create a customized chat message; and causing, by the host chat application of the chat message service provider, the customized chat message to be provided to the computing device associated with the second user to be rendered by the computing device associated with the second user via the chat message UI of the first user.

2. The method of claim 1, further comprising providing a component model for use by a user for writing a user-specific component that provides the user with a capability to alter HTML (hypertext markup language) code, JavaScript code, and CSS (cascading style sheets) code in the DOM (document object model) used to render a chat message UI on a webpage of the user and that identifies one or more user-selected customizations for the chat message UI for deployment on the webpage of the user.

3. The method of claim 2, wherein the providing a component model comprises providing a component model from an integrated system that provides user-selectable options for selecting customizations.

4. The method of claim 1, wherein the receiving a user-specific component customized by the first user comprises:

providing a user interface for receiving user-selection of the one or more user-selected customizations for a chat message UI of the first user;

receiving user-selection of the one or more user-selected customizations for a chat message UI of the first user;

generating code, based on the received one or more user-selected customizations, for rendering the one or more user-selected customizations for the chat message UI of the first user; and storing the generated code as the user-specific component customized by a first user.

5. The method of claim 1, wherein the providing a first snippet of code comprises providing a JavaScript snippet of code.

6. The method of claim 1, wherein the activation of the first snippet of code comprises activation of the first snippet of code responsive to selection of a chat message widget on the webpage of the first user by a second user.

7. The method of claim 1, wherein the first snippet of code contains information about the deployment settings for the chat message UI of the first user and not information specifying the customizations for the chat message UI of the user.

8. The method of claim 1, wherein the one or more user-selected customizations for a chat message UI of the first user includes a customer provided resource wherein the customer provided resource includes an image, CSS code, and/or video.

9. The method of claim 1, wherein the one or more user-selected customizations comprises one or more of: shortening a URL within the text content; rendering media inline in the message bubble, the media including a video and/or image; supporting and displaying an emoji; adding a link image preview for links in a message; and rendering another component within the message bubble to: show a carousel of shopping options, a checkout/pay selection widget for a shopping cart, a flow to fill out a form, or collect a digital signature.

10. The method of claim 1, wherein the applying the one or more user-selected customizations to the received chat message to create a customized chat message comprises:
replacing text in the actual chat message with something else, the something else comprising an inline image, video, or other rich media.

11. A system implemented by a chat message service provider for providing a customizable chat window to a second user for a webpage provided by a first user, the system comprising one or more processors configured by programming instructions on non-transitory computer readable media, the system configured to:
receive, at the chat message service provider over a network from a computing device associated with the first user, a user-specific component customized by the first user that identifies one or more user-selected customizations for a chat message user interface (UI) of the first user, the one or more user-selected customizations for a chat message UI of the first user including user-customized HTML code and/or JavaScript code that affects the appearance and/or content in a chat bubble for a chat message;
provide a first snippet of code from a host chat application implemented by the chat message service provider to a computing device associated with the first user to add to the webpage of the first user wherein activation of the first snippet of code at the webpage of the first user responsive to an action by a computing device associated with the second user causes the host chat application implemented by the chat message service provider to be bootstrapped and causes the chat message UI of the first user to be loaded by the host chat application with the one or more user-selected customizations for the chat message UI of the first user;
provide second code, from the host chat application, for rendering the chat message UI of the first user along with the one or more user-selected customizations for the chat message UI of the first user, over a network, to the computing device associated with the second user responsive to activation of the first snippet of code;
receive a chat message from a computing device associated with the first user via the chat message UI of the first user;
wherein the host chat application is configured to apply the one or more user-selected customizations to the received chat message to create a customized chat message; and
cause the customized chat message to be provided to the computing device associated with the second user to be rendered by the computing device associated with the second user via the chat message UI of the first user.

12. The system of claim 11, further configured to provide a component model for use by a user for writing a user-specific component that provides the user with a capability to alter HTML code, JavaScript code, and CSS code in the DOM (document object model) used to render a chat message UI on a webpage of the user and that identifies one or more user-selected customizations for the chat message UI for deployment on the webpage of the user.

13. The system of claim 12, wherein to provide a component model, the system is configured to provide a component model from an integrated system that provides user-selectable options for selecting customizations.

14. The system of claim 11, wherein to receive a user-specific component customized by the first user, the system is configured to:
provide a user interface for receiving user-selection of the one or more user-selected customizations for a chat message UI of the first user;
receive user-selection of the one or more user-selected customizations for a chat message UI of the first user;
generate code, based on the received one or more user-selected customizations, for rendering the one or more user-selected customizations for the chat message UI of the first user; and
store the generated code as the user-specific component customized by a first user.

15. The system of claim 11, wherein the first snippet of code comprises a JavaScript snippet of code.

16. The system of claim 11, wherein the first snippet of code contains information about the deployment settings for the chat message UI of the first user and not information specifying the customizations for the chat message UI of the user.

17. The system of claim 11, wherein the one or more user-selected customizations comprises one or more of: shortening a URL within the text content; rendering media inline in the message bubble, the media including a video and/or image; supporting and displaying an emoji; adding a link image preview for links in a message; and rendering another component within the message bubble to: show a carousel of shopping options, a checkout/pay selection widget for a shopping cart, a flow to fill out a form, or collect a digital signature.

18. The system of claim 11, wherein to apply the one or more user-selected customizations to the received chat message to create a customized chat message, the host chat application is configured to:
replace text in the actual chat message with something else.

19. The system of claim 18, wherein to replace text in the actual chat message with something else, the host chat application is configured to add an inline image, video, or other rich media.

20. Non-transitory computer readable media encoded with programming instructions configurable to cause a processor at a chat message service provider to perform a method, the method comprising:
receiving, at the chat message service provider over a network from a computing device associated with a first user, a user-specific component customized by the first user that identifies one or more user-selected customizations for a chat message user interface (UI) of the first user, the one or more user-selected customizations for a chat message UI of the first user including user-customized HTML code and/or JavaScript code that affects the appearance and/or content in a chat bubble for a chat message;
providing, by the chat message service provider, a first snippet of code from a host chat application implemented by the chat message service provider to a computing device associated with the first user to add to the webpage of the first user wherein activation of the first snippet of code at the webpage of the first user responsive to an action by a computing device associated with a second user causes the host chat application implemented by the chat message service provider to be bootstrapped and causes the chat message UI of the first user to be loaded by the host chat application with the one or more user-selected customizations for the chat message UI of the first user;

providing, by the host chat application of the chat message service provider, second code for rendering the chat message UI of the first user along with the one or more user-selected customizations for the chat message UI of the first user, over a network, to the computing device associated with the second user responsive to activation of the first snippet of code;

receiving, by the host chat application of the chat message service provider, a chat message from a computing device associated with the first user via the chat message UI of the first user;

applying, by the host chat application of the chat message service provider, the one or more user-selected customizations to the received chat message to create a customized chat message; and causing, by the host chat application of the chat message service provider, the customized chat message to be provided to the computing device associated with the second user to be rendered by the computing device associated with the second user via the chat message UI of the first user.

* * * * *